United States Patent
Tanaka et al.

(10) Patent No.: US 10,396,543 B2
(45) Date of Patent: Aug. 27, 2019

(54) PROTECTION DEVICE

(71) Applicant: LITTELFUSE JAPAN G.K., Tokyo (JP)

(72) Inventors: Arata Tanaka, Ryugasaki (JP); Masaaki Iwai, Choshi (JP); Tsuyoshi Takizawa, Hokota (JP)

(73) Assignee: LITTELFUSE JAPAN G.K., Tokyo (JP)

(*) Notice: Subject to any disclaimer, the term of this patent is extended or adjusted under 35 U.S.C. 154(b) by 351 days.

(21) Appl. No.: 15/023,977

(22) PCT Filed: Sep. 24, 2014

(86) PCT No.: PCT/JP2014/075306
§ 371 (c)(1),
(2) Date: Mar. 22, 2016

(87) PCT Pub. No.: WO2015/046258
PCT Pub. Date: Apr. 2, 2015

(65) Prior Publication Data
US 2016/0241012 A1    Aug. 18, 2016

(30) Foreign Application Priority Data
Sep. 25, 2013  (JP) .................. 2013-198819

(51) Int. Cl.
H02H 3/08    (2006.01)
H02H 9/00    (2006.01)
(Continued)

(52) U.S. Cl.
CPC ............. *H02H 3/085* (2013.01); *H01C 3/14* (2013.01); *H02H 9/001* (2013.01); *H02H 9/026* (2013.01)

(58) Field of Classification Search
CPC ...... H01L 2924/00; H01L 2924/00014; H02H 3/085; H02H 9/026; H01C 9/026
(Continued)

(56) References Cited

U.S. PATENT DOCUMENTS 3,644,864 A * 2/1972 Hirsbrunner ............ G01K 7/24
                                                         323/369
3,673,538 A * 6/1972 Faxon .................... H01C 7/022
                                                         338/22 R
(Continued)

FOREIGN PATENT DOCUMENTS

CN    101233585 A    7/2008
CN    201466666 U    5/2010
(Continued)

OTHER PUBLICATIONS

International Search Report for International Application No. PCT/JP2014/075306, dated Nov. 4, 2014.

*Primary Examiner* — Dharti H Patel

(57) ABSTRACT

The present invention provides a protection device that can more surely protect an electronic or an electric apparatus even when an inrush current value is large and its magnitude has large dispersion, and that has a recovery property. The protection device of the present invention includes a PTC component; a resistive component; and a first terminal and a second terminal, wherein the first terminal, the PTC component, the resistive component, and the second terminal are electrically connected in series in this order.

17 Claims, 1 Drawing Sheet

(51) Int. Cl.
*H01C 3/14* (2006.01)
*H02H 9/02* (2006.01)

(58) Field of Classification Search
USPC .......................................................... 361/106
See application file for complete search history.

(56) References Cited

U.S. PATENT DOCUMENTS

| | | | | |
|---|---|---|---|---|
| 4,347,539 | A * | 8/1982 | Peterson | H01C 7/12 |
| | | | | 361/16 |
| 5,995,392 | A | 11/1999 | Turner | |
| 6,040,972 | A * | 3/2000 | Takeuchi | H02H 9/026 |
| | | | | 361/106 |
| 6,078,160 | A * | 6/2000 | Cilluffo | H01H 47/10 |
| | | | | 318/641 |
| 6,989,976 | B2 * | 1/2006 | Ashiya | H02H 3/085 |
| | | | | 361/27 |
| 7,333,313 | B2 * | 2/2008 | Bouchard | H05B 41/2926 |
| | | | | 315/307 |
| 8,716,970 | B2 * | 5/2014 | Chang | H02P 29/60 |
| | | | | 318/445 |
| 8,766,602 | B1 * | 7/2014 | Kimes | H02H 9/001 |
| | | | | 320/137 |
| 2004/0109272 | A1 * | 6/2004 | Cheevanantachai | H02H 7/1213 |
| | | | | 361/82 |
| 2004/0136136 | A1 * | 7/2004 | Walsh | H01C 1/016 |
| | | | | 361/106 |
| 2007/0164709 | A1 * | 7/2007 | Tsubaki | H02J 7/0031 |
| | | | | 320/134 |
| 2013/0027827 | A1 * | 1/2013 | Ge | H02H 5/042 |
| | | | | 361/93.8 |

FOREIGN PATENT DOCUMENTS

| | | |
|---|---|---|
| CN | 101872968 A | 10/2010 |
| CN | 102025140 A | 4/2011 |
| CN | 202856336 U | 4/2013 |
| JP | S62233193 A | 10/1987 |
| JP | S63257416 A | 10/1988 |
| JP | H35135 B | 1/1991 |
| JP | H3118433 A | 5/1991 |
| JP | H446502 U1 | 4/1992 |
| JP | H10126959 A | 5/1998 |
| JP | 10-304560 A | 11/1998 |
| JP | H1195809 A | 4/1999 |
| JP | 2004-241665 A | 8/2004 |
| JP | 2005253154 A | 9/2005 |
| JP | 2007-37278 A | 2/2007 |

* cited by examiner

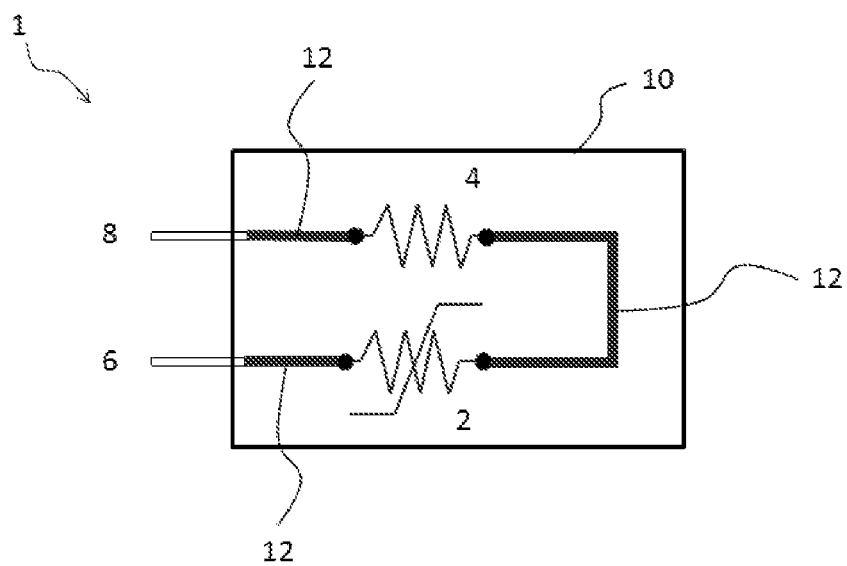

PROTECTION DEVICE

FIELD OF THE INVENTION

The present invention relates to a protection device comprising a PTC component and a resistive component.

BACKGROUND OF THE INVENTION

In electronic and electric apparatuses, various protection devices or various protection circuits are used to protect electric elements or a circuit from a transitional excessive current that may flow immediately after a power is turned on (hereinafter, also referred to as "inrush current") and from various abnormally large currents such as a continuous excessive current generated by any abnormality, for example, short-circuiting (hereinafter, also referred to simply as "excessive current"), that is, an abnormal current.

As such a protection device, Japanese Patent Publication No. 2004-241665 discloses a resistive device comprising a thermal fuse. In the resistive device comprising the thermal fuse, a resistive component and the thermal fuse component are electrically connected to each other in series, and the resistive device is configured such that, when an inrush current or an excessive current flows through the resistive component comprising the thermal fuse, a Joule heat is generated in the resistive component, the thermal fuse component is fused by this heat, and the inrush current or the excessive current is interrupted, and thereby the electronic or the electric apparatus are protected.

PRIOR ART REFERENCE

Patent Reference

Japanese Patent Publication No. 2004-241665 is a prior reference.

SUMMARY OF THE INVENTION

Problem to be Solved by the Invention

Recently, in electric apparatuses such as, especially, home appliances and the like, there is a tendency for increasing a capacitance of an AC power source smoothing capacitor and reducing their ripple content rates. The reduction of the ripple content rate suppresses an increase of the temperature of the dielectric substance because of the structure of the smoothing capacitor. The behavior of the ripple current/voltage can be regarded as charging and discharging for the smoothing capacitor, and the reduction of the ripple content rate can improve the life reliability of the smoothing capacitor. A circuit used in electric apparatuses has also become complicated. With this increase of the complicatedness, the inrush current which may be generated has been increased, and the dispersion of the current value of the inrush current has also been increased. With the increase of the inrush current and the increase of the dispersion of the inrush current value as mentioned above, when the conventional protection component as described in Japanese Patent Publication No. 2004-241665 is used, since the fusing of the thermal fuse component frequently occur due to the heat generation of the resistive component, problems arise that displacement of the device is necessary every time of the fusing, and work for a repair is necessary and the downtime becomes long. For such a resistive device comprising a thermal fuse, a whole substrate on which the resistive device comprising a thermal fuse is mounted usually needs to be replaced and the load of the cost is also heavy.

To prevent the frequent replacement of the resistive device comprising a thermal fuse as mentioned above, it can be considered that an activating temperature of the thermal fuse component, that is, a melting point of a material constituting the thermal fuse element is increased. However, in the case where the activating temperature of the thermal fuse component is increased, the time period necessary for the fusing of the thermal fuse becomes long and the apparatus may be damaged by the excessive current when the smoothing capacitor is short-circuited. Since the activating temperature of the thermal fuse component is determined by the melting point of the material constituting the thermal fuse component and a temperature capable of being set as the activating temperature is limited and any precise temperature adjustment is difficult.

A problem to be solved by the present invention is to provide a protection device that can more surely protect an electronic or an electric apparatus even when an inrush current value is large and its magnitude has large dispersion, and that has a recovery property.

As a result of intensive studies by the inventors of the present invention, it has been found that the problems described above can be solved by combining a PTC (positive temperature coefficient) component and a resistive component, and have completed the present invention.

According to a first aspect of the present invention, there is provided
a protection device comprising:
a PTC component;
a resistive component; and
a first terminal and a second terminal, wherein
the first terminal, the PTC component, the resistive component, and the second terminal are electrically connected in series in this order.

According to a second aspect of the present invention, there is provided a protection circuit comprising the protection device.

According to a third aspect of the present invention, there is provided an electric apparatus comprising the protection device or the protection circuit.

By combining and using the PTC component and the resistive component and electrically connecting these components to each other in series, a protection device which can more surely interrupt the inrush current and the excessive current, and has a recovery property can be provided.

BRIEF DESCRIPTION OF THE DRAWINGS

FIG. 1 schematically shows a wiring diagram of one embodiment of a protection device of the present invention (the PTC component and the resistive component are depicted by graphic symbols for simplicity).

DETAILED DESCRIPTION OF THE INVENTION

A protection device of the present invention comprises a first terminal, a PTC component, a resistive component, and a second terminal that are electrically connected to each other in series in this order. When an inrush current or an abnormal current flows through the protection device, the resistive component suppresses the flow of the current and the PTC component trips (that is, activates) to become a high resistance state, and then substantially interrupts the current (while a very small current may flow as a leaking current).

For example, the inrush current is generated mainly attributable to capacitance (including floating capacitance) in an electronic apparatus or an electronic circuit, and is therefore attenuated with accumulation of a charge in the capacitance. When the inrush current is attenuated, the current flowing through the protection device is reduced, the tripping of the PTC component is cancelled, and a stationary current starts to flow through the electronic apparatus or the electronic circuit. For example, when an excessive current flows, the PTC component continuously trips to protect the circuit until the cause of the excessive current is removed. When the cause of the excessive current is removed, the tripping of the PTC component is cancelled and the current can flow again. That is, the protection device of the present invention provides the protection against the inrush current and the abnormal current, and simultaneously has a recovery property.

Furthermore, since the protection device of the present invention uses the PTC component, the protection device can provide a proper protection even against an abnormal heat generation. The "abnormal heat generation" means a phenomenon that an unexpected heat generation occurs in a circuit or an apparatus, or in the vicinity thereof, and an ambient temperature of the protection device reaches an abnormally high temperature. The "ambient temperature" means a temperature of the ambient air surrounding a component such as the protection device in this case, or a temperature of another member in contact with the protection device. The "abnormally high temperature" does not mean a specific temperature, is appropriately determined depending on an use, a circuit or an apparatus to be protected, or the like, and means, for example, a temperature that is higher by a predetermined value than a temperature range permitted for an ordinary operation of the apparatus, a temperature exceeding the rated temperature of a used part by a predetermined value, and the like.

The PTC component used in the protection device of the present invention is not particularly limited, and either a ceramic PTC component or a polymer PTC component may be used. The polymer PTC component is preferably used since a self-destruction is unlikely to occur even when its temperature reaches over a certain temperature in comparison with the ceramic PTC component, and the ceramic PTC component has an inductance component and has large floating capacitance as a result of which the inrush current is large.

Generally, the above mentioned polymer PTC component comprises a laminate PTC element which is formed by extruding an electrically conductive composition containing a polymer (for example, a polyethylene, a polyvinylidene fluoride, or the like) in which an electrically conductive filler (for example, carbon black, nickel alloy, or the like) is dispersed, and electrodes (for example, metal foils) which are disposed on both sides thereof.

The holding current of the PTC component is not particularly limited and can appropriately be selected depending on the magnitude of the expected inrush current. As to the holding current of the PTC component, the PTC component activates for the stationary current in the case where the holding current is too small, and does not activate when an inrush current flows therethrough in the case where the holding current is too large. Therefore, the holding current is in a range, for example, 0.1 to 5 A, preferably 0.1 to 2 A, and more preferably 0.1 to 0.55 A. It is noted that the "holding current" used herein means the largest current which is able to flow through the PTC component at the room temperature (specifically, 25° C.) without causing the PTC component to activate. The "stationary current" means a current in the case where the value of the current flowing through an electronic apparatus or an electronic circuit is substantially constant, that is, a current flowing through the electronic apparatus or the electronic circuit when the electronic apparatus or the electronic circuit operates without any abnormality.

The withstanding voltage of the PTC component is not particularly limited, for example, only has to be equal to or higher than an AC voltage of the ordinary household power source. The withstanding voltage is, specifically, 100 Vac or higher, preferably 140 Vac or higher, more preferably 240 Vac or higher, and further preferably 300 Vac or higher. Preferably, the withstanding voltage of the PTC component is set to be, for example, 500 Vac or higher and to especially be 530 Vac or higher depending on a used transformer. The "withstanding voltage" used herein means the maximal value of the voltage at which the PTC component can normally activate. Specifically, the withstanding voltage is determined as follows. When a voltage is applied to the PTC component, the PTC component generates heat by itself depending on the voltage and the resistance value of the PTC component itself is determined. The withstanding voltage means a voltage such that, when the voltage is applied to the PTC component, the resistance value of the PTC component depending on the applied voltage is 70% of a 1000-fold value of the standard resistance value (that is, the resistance value at 25° C.) of the PTC component.

The resistance value at the room temperature (specifically, 25° C.) of the PTC component is not particularly limited, and can properly be selected depending on the purpose. For example, the resistance value of the polymer PTC component can be set to be 0.05 $\Omega$ or more such that the polymer PTC component maintains a state of tripping at a voltage of 265 V. To set the value of the leaking current to be 0.03 A or less during the tripping of the polymer PTC component at the voltage of 265 V applied, the resistance value of the polymer PTC component can be set to be 0.45$\Omega$ or more. By setting the resistance value of the polymer PTC component to be 65$\Omega$ or less, the dispersion of the resistance value of the polymer PTC component can easily be made smaller by the manufacture thereof. Preferably, the resistance value of the polymer PTC component at the room temperature is 0.05 to 65$\Omega$, more preferably 0.30 to 10$\Omega$, and further preferably 0.45 to 2.4 $\Omega$.

It is noted that the resistance value of the polymer PTC component used herein means a resistance value (measured by four-terminal method, applied current of a measurement range of a resistance measurement equipment: 100 mA) which is calculated from an applied voltage and a current value which is measured when the applied voltage of 6.5 mV (direct current) is applied at 25° C. between both electrodes of a PTC component which is produced by the pressure-bonding of electrodes (preferably, nickel foils) on both sides of a PTC element obtained by the extrusion of an electrically conductive composition comprising a polymer. It is noted that since a resistance value of the electrodes is negligibly small in comparison with the resistance value of the PTC element, the resistance value of the PTC component is substantially equal to the resistance value of the PTC element.

The resistive component used in the protection device of the present invention is not particularly limited and a general resistive component can be used. Examples of the resistive component include, for example, a wire wound resistor, a cement resistor, a chip resistor, a carbon coated resistor, a metal film resistor, a metal oxide film resistor, and the like.

Among them, the wire wound resistor or the cement resistor is preferably used since these resistors can more effectively suppress the inrush current and the excessive current.

In the present invention, the resistive component suppresses the flows of the inrush current and the excessive current flowing through the circuit to be protected. Additionally, the resistive component also has a function of, when the PTC component trips and recovers thereafter and the resistance value of the PTC component is varied from that before the tripping, alleviating the influence given by the variation of the resistance value on the current flowing through the circuit to be protected. For example, in the case where it is assumed that the resistive component is not present, when the resistance value of the PTC component becomes a double resistance value after its recovery compared to the resistance value before the tripping, the current flowing through the circuit is reduced to 50% of the current before the tripping. On the other hand, for example, even when the resistance value of the PTC component becomes a four-fold value by providing a resistive component having a 10-fold resistance value of the resistance value of the PTC component, the value of the current flowing through the circuit can be maintained to be about 80% of that before the tripping.

The resistance value of the resistive component may be, for example, at least a 10-fold value, for example a 10- to a 50-fold value, preferably a 30- to a 50-fold value of the resistance value of the PTC component at the room temperature (specifically, 25° C.). By setting the resistance value of the resistive component to be a 10-fold value or more of the resistance value of the resistive component, the influence given by the variation of the resistance value of the PTC component on the current flowing through the circuit can be suppressed. On the other hand, by setting the resistance value of the resistive component to be a 50-fold value or less of the resistance value of the PTC component, the power consumption by the resistive component can become smaller.

The resistance value of the resistive component is not particularly limited, but may be, specifically 1 to 650Ω, preferably 1.5 to 500Ω, and more preferably 2 to 50Ω.

In the protection device of the present invention, preferably, the PTC component may be under the influence of the Joule heat generated by the resistive component (hereinafter, also referred to as "under the heat influence"). The state where the PTC component is under the heat influence of the resistive component means an environment where the PTC component can trip due to the Joule heat generated by the resistive component when an inrush current or an excessive current occurs. By disposing the PTC component such that it is under the heat influence of the resistive component, since the temperature of the PTC component is increased, the holding current is reduced. As a result, the inrush current and the excessive current can more rapidly and more surely be interrupted.

The protection device of the present invention comprises the first terminal and the second terminal electrically connected to the PTC component and the resistive component, respectively. These terminals provide a function of connecting the protection device of the present invention to another electronic element.

In the protection device of the present invention, each of elements (the PTC component, the resistive component, the first terminal, and the second terminal) may directly be connected to each other or may be connected to each other via a lead. The connection can be established by using a known means such as soldering, welding, or the like.

The protection device of the present invention may comprise an outer cover (that is, a housing or a casing). The outer cover has a function of protecting the PTC component and the resistive component, and facilitates the handling of the protection device. For example, in the protection device of the present invention, the PTC component, the resistive component, and a portion of each of the first terminal and the second terminal are covered by the outer cover, and the remaining portion of each of the first terminal and the second terminal protrudes from the outer cover. The outer cover is not particularly limited and may be an ordinarily used one such as a resin casing or the like.

In FIG. 1, a wiring diagram of one embodiment of the protection device 1 of the present invention is schematically shown (in which the PTC component and the resistive component are depicted using graphic symbols for simplicity). In this embodiment, each of elements (the PTC component 2, the resistive component 4, the first terminal 6, and the second terminal 8) is connected to each other via the lead 12. The PTC component 2 and the resistive component 4 are electrically connected to each other in series via the lead 12 and are disposed adjacent to each other such that the PTC component is under the heat influence of the resistive component. The first terminal 6 and the second terminal 8 are electrically connected to the PTC component 2 and the resistive component 4 in series via the lead 12, respectively. As illustrated, except the portion of the first terminal 6 and the portion of the second terminal 8, they are positioned inside a casing 10, and the portion of the first terminal 6 and the portion of the second terminal 8 protrude from one face of the casing 10. The protection device of the present invention is connected to other electric elements by the portion of the first terminal 6 and the portion of the second terminal 8.

The protection device of the present invention is not limited to the illustrated embodiment. For example, in FIG. 1, the first terminal and the second terminal protrude from the same face of the casing, however the first terminal and the second terminal may protrude from different surfaces of the casing, for example, surfaces that face each other. By filling the inside of the casing with a resin having a high heat conductivity such as a silicone resin, sensitivity of the PTC component to the heat influence of the resistive component may be increased. In addition, various modifications of the protection device of the present invention can be performed within a scope in which its functions are not lost.

The protection device of the present invention can be used as an inrush current limiting component for various electronic and various electric apparatuses.

THE ELEMENT REFERENCE NUMERALS ARE

1—protection device
2—PTC component
4—resistive component
6—first terminal
8—second terminal
10—casing
12—lead

What is claimed is:

1. A protection device comprising:
 a PTC component;
 a resistive component; and
 a first terminal and a second terminal, wherein the first terminal, the PTC component, the resistive component, and the second terminal are electrically connected in series in this order;

wherein a resistance value of the resistive component is between 10-fold and 50-fold of a resistance value of the PTC component at a room temperature.

2. The protection device according to claim 1, wherein the resistance value of the resistive component is 1 to 650 ohms.

3. The protection device according to claim 2, wherein the resistive component is a wire wound resistor or a cement resistor.

4. The protection device according to claim 1, wherein the resistive component is a wire wound resistor or a cement resistor.

5. The protection device according to claim 1, wherein a holding current of the PTC component is 0.1 to 5 A.

6. The protection device according to claim 1, wherein a withstanding voltage of the PTC component is 100 Vac or more.

7. The protection device according to claim 1, wherein the PTC component is a polymer PTC component.

8. The protection device according to claim 1, wherein the PTC component is under a heat influence of the resistive component.

9. The protection device according to claim 1, wherein the resistance value of the resistive component is 1 to 650 ohms.

10. The protection device according to claim 1, wherein the resistive component is a wire wound resistor or a cement resistor.

11. The protection device according to claim 1, wherein the PTC component is a polymer PTC component.

12. A protection circuit comprising a protection device, said protection device comprising:
a PTC component;
a resistive component; and
a first terminal and a second terminal, wherein the first terminal, the PTC component, the resistive component, and the second terminal are electrically connected in series in this order;
wherein a resistance value of the resistive component is between 10-fold and 50-fold of a resistance value of the PTC component at a room temperature.

13. The protection circuit of claim 12, wherein the resistance value of the resistive component is 1 to 650 ohms.

14. The protection circuit of claim 12, wherein the resistive component is a wire wound resistor or a cement resistor.

15. The protection circuit of claim 12, wherein the PTC component is a polymer PTC component.

16. An electric apparatus comprising a protection device, said protection device comprising:
a PTC component;
a resistive component; and
a first terminal and a second terminal, wherein the first terminal, the PTC component, the resistive component, and the second terminal are electrically connected in series in this order;
wherein a resistance value of the resistive component is between 10-fold and 50-fold of a resistance value of the PTC component at a room temperature.

17. The electric apparatus according to claim 16, wherein the resistance value of the resistive component is 1 to 650 ohms.

* * * * *